US008081823B2

(12) United States Patent
Zandifar et al.

(10) Patent No.: US 8,081,823 B2
(45) Date of Patent: Dec. 20, 2011

(54) SEGMENTING A STRING USING SIMILARITY VALUES

(75) Inventors: Ali Zandifar, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 1064 days.

(21) Appl. No.: 11/943,285

(22) Filed: Nov. 20, 2007

(65) Prior Publication Data

US 2009/0129676 A1 May 21, 2009

(51) Int. Cl.
*G06K 9/00* (2006.01)
*G06K 9/66* (2006.01)

(52) U.S. Cl. .......................................... 382/181; 382/190

(58) Field of Classification Search ........... 382/168–231
See application file for complete search history.

(56) References Cited

U.S. PATENT DOCUMENTS

| | | | |
|---|---|---|---|
| 5,734,737 A * | 3/1998 | Chang et al. .................. | 382/107 |
| 6,148,102 A | 11/2000 | Stolin | |
| 6,337,924 B1 * | 1/2002 | Smith ........................... | 382/190 |
| 6,354,630 B1 | 3/2002 | Zhang et al. | |
| 6,574,348 B1 | 6/2003 | Venkatesan et al. | |
| 6,580,804 B1 | 6/2003 | Abe | |
| 6,721,439 B1 | 4/2004 | Levy et al. | |
| 6,738,495 B2 | 5/2004 | Rhoads et al. | |
| 6,763,122 B1 | 7/2004 | Rodriguez et al. | |
| 6,769,061 B1 | 7/2004 | Ahern | |
| 6,771,820 B1 | 8/2004 | Oakeson | |
| 6,775,393 B2 | 8/2004 | Levy et al. | |
| 6,909,803 B2 | 6/2005 | Uchida | |
| 6,973,195 B1 | 12/2005 | Matsui | |
| 6,983,056 B1 | 1/2006 | Amano | |
| 6,993,154 B2 | 1/2006 | Brunk | |
| 7,031,493 B2 | 4/2006 | Fletcher et al. | |
| 7,039,214 B2 | 5/2006 | Miller et al. | |
| 7,039,215 B2 | 5/2006 | Suzaki | |
| 7,043,080 B1 | 5/2006 | Dolan | |
| 7,058,200 B2 | 6/2006 | Donescu et al. | |
| 7,061,492 B2 | 6/2006 | Carrai et al. | |
| 7,062,069 B2 | 6/2006 | Rhoads | |
| 7,072,487 B2 | 7/2006 | Reed et al. | |
| 7,076,081 B2 | 7/2006 | Hwang et al. | |
| 7,085,399 B2 | 8/2006 | Suzaki | |
| 7,106,884 B2 | 9/2006 | Tamaru | |
| 7,107,451 B2 | 9/2006 | Moskowitz | |
| 7,130,444 B2 | 10/2006 | Honsinger et al. | |
| 7,130,461 B2 | 10/2006 | Rosenholtz | |
| 7,133,565 B2 | 11/2006 | Toda et al. | |
| 7,159,118 B2 | 1/2007 | Petrovic | |
| 7,197,161 B2 | 3/2007 | Fan | |
| 7,203,335 B2 | 4/2007 | Fielding et al. | |
| 7,203,565 B2 | 4/2007 | Sato | |
| 2002/0009286 A1 * | 1/2002 | Kasutani ......................... | 386/46 |
| 2002/0029338 A1 | 3/2002 | Bloom et al. | |

(Continued)

*Primary Examiner* — Alex Liew

(57) ABSTRACT

Disclosed are systems and methods for segmenting a string comprised of one or more string segments using similarity values. In embodiments, each string segment may contain at least a variation of a marker string that may be used to separate string segments in the string. In embodiments, a similarity value representing the result of comparing the marker string to substrings of the string may be computed, and a similarity vector representing the set of comparisons for the locations on the string may be generated. In embodiments, the similarity vector may be used to identify candidate segmentation locations in the string. In embodiments, a set of segmentation locations in the string may be derived from the candidate segmentation locations in the string, and the string may be segmented according to the set of segmentation locations.

18 Claims, 10 Drawing Sheets

U.S. PATENT DOCUMENTS

| | | |
|---|---|---|
| 2003/0039394 A1* | 2/2003 | Yamazaki ............... 382/176 |
| 2003/0068097 A1 | 4/2003 | Wilson et al. |
| 2004/0101160 A1 | 5/2004 | Kunisa |
| 2004/0263911 A1 | 12/2004 | Rodriguez et al. |
| 2005/0002566 A1 | 1/2005 | Di Federico et al. |
| 2006/0203255 A1 | 9/2006 | Takaragi et al. |
| 2006/0210108 A1 | 9/2006 | Brunk et al. |
| 2007/0005977 A1 | 1/2007 | Tohne et al. |
| 2007/0147653 A1 | 6/2007 | Reed et al. |
| 2007/0201099 A1 | 8/2007 | Eguchi et al. |

\* cited by examiner

200

Compute similarity vector using similarity value measurement between a marker string and substrings of a string to be segmented — 205

↓

Identify a set of segmentation locations in the string — 210

↓

Segment the string using the set of segmentation locations — 215

SEGMENTING A STRING USING SIMILARITY VALUES

BACKGROUND

A. Technical Field

The present invention pertains generally to data processing, and relates more particularly to segmenting a string using similarity values.

B. Background of the Invention

Systems and methods for communicating data have proliferated over the last few years. And, data communication systems and methods appear to continue to grow in the future. Common to various means of communication is that the data communications typically comprise a number of discrete messages or message components, such as sequences of characters, bits, or other representations of information.

For a receiver to understand the information communicated to him or her, it is important that the receiver have the ability to properly segment the communicated data. If the receiver does not know how to properly segment the data or if the receiver improperly segments the data, it is unlikely that the receiver will correctly understand the communicated information.

SUMMARY OF THE INVENTION

Systems and methods are described for segmenting a string comprised of one or more string segments using similarity values. In embodiments, each string segment may contain at least a variant of a marker string prefix that may be used to determine the beginning of a string segment in the string. In embodiments, a similarity value representing the result of comparing the marker string to substrings of the string may be computed, and a similarity vector representing the set of comparisons for all of the locations on the string may be generated. In embodiments, the similarity vector may be used to identify candidate segmentation locations in the string. In embodiments, a set of segmentation locations in the string may be derived from the candidate segmentation locations in the string, and the string may be segmented according to the set of segmentation locations.

In embodiments, a method for segmenting a string comprising one or more segments into discrete segments may comprise generating a similarity vector comprising a plurality of similarity values and associated locations within the string; generating a set of segmentation locations using a set of ideal segmentation locations and a set of candidate segmentation locations obtains from a set of locations in the similarity vector; and using the set of segmentation locations to segment the string. In embodiments, each segment may comprise data that is the same as or similar to a marker string. In embodiments, a similarity value represents a comparison of the marker string and at least a portion of the strong, and an associated location associated with the similarity value is the location within the string of the start of at least a portion of the string used in the comparison. In embodiments, the set of locations in the similarity vector corresponds to local maximum similarity values within a distance threshold of the locations in the similarity vector corresponding to ideal segmentation locations from the set of ideal segmentation locations.

In embodiments, a similarity value from the plurality of similarity values may be obtained by selecting a first substring of the string that has a number of characters equal to the number of characters of the marker string; identifying a longest common subsequence between the marker string and the first substring; and calculating the similarity value by dividing the number of characters of the longest common subsequence by the number of characters of the first substring.

In embodiments, generating a set of segmentation locations using a set of ideal segmentation locations and a set of candidate segmentation locations may comprise identifying a set of ideal segmentation locations based upon an expected number of discrete segments in the string; using the similarity vector to identify a set of candidate segmentation locations; removing a candidate segmentation location from the set of candidate segmentation locations if the candidate segmentation location has a similarity value less than another candidate segmentation location within a local window; removing a candidate segmentation location from the set of candidate segmentation locations if the distance between the candidate segmentation location and a closest ideal segmentation location is greater than a distance threshold; and using the set of candidate segmentation locations and the set of ideal segmentation locations to generate the set of segmentation locations. In embodiments, the local window is equal to the number of characters of the marker string.

In embodiments, the step of using the similarity vector to identify a set of candidate segmentation locations may comprise generating a smoothed similarity vector by applying a low-pass filter to the similarity vector; calculating a histogram of similarity values from the smoothed similarity vector; calculating a similarity value threshold using the histogram of similarity values and the expected number of discrete segments; and adding an element of the similarity vector to the set of candidate segmentation locations if the element has a similarity value that is greater than or equal to the similarity value threshold.

In embodiments, using a set of candidate segmentation locations and a set of ideal segmentation locations to generate the set of segmentation locations may comprise defining the set of ideal segmentation locations as a set of segmentation locations if the set of candidate segmentation locations is an empty set; and using at least some of the candidate segmentation locations to define a set of segmentation locations if the set of candidate segmentation locations is not an empty set.

In embodiments, using at least some of the candidate segmentation locations to define a set of segmentation locations may comprise adding the candidate segmentation location to the set of segmentation locations if an ideal segmentation location is within a distance threshold of a candidate segmentation location; adding an ideal segmentation location to the set of segmentation locations if it is at either the beginning or at the end of the set of ideal segmentation locations if the ideal segmentation location is not within a distance threshold of a candidate segmentation location; and adding an estimated segmentation location to the set of segmentation locations either by using a previous segmentation location within the distance threshold of a previous ideal segmentation location adjacent to the ideal segmentation location and a next segmentation location within the distance threshold of a subsequent ideal segmentation location adjacent to the ideal segmentation location to calculate an estimated segmentation location or by using the ideal segmentation location as the estimated segmentation location if either the previous segmentation location or the next segmentation location is not within the distance threshold of an ideal segmentation location.

In embodiments, a method for segmenting a string comprising one or more segments into discrete segments may comprise generating a similarity vector comprising a plurality of similarity values and associated locations within the string; identifying a set of ideal segmentation locations in the string based upon an expected number of discrete segments in the string; using the similarity vector to generate a set of candidate segmentations in the string; using the set of candidate segmentation locations and the set of ideal segmentation locations to generate the set of segmentation locations; and using the set of segmentation locations to segment the string. In embodiments, each segment may comprise data that is the same as or similar to a marker string. In embodiments, the similarity vector may be comprised of one or more similarity values based upon one or more comparisons between the marker string and the string. In embodiments, a similarity value represents a comparison of the marker string and at least a portion of the strong, and an associated location associated with the similarity value is the location within the string of the start of at least a portion of the string used in the comparison. In embodiments, the set of segmentation locations may be generated by identifying a set of segmentation locations in the similarity vector corresponding to local maximum similarity values within a threshold distance of locations corresponding to ideal segmentation locations.

In embodiments, a system for segmenting a string comprising one or more segments into discrete segments where each segment comprises data that is the same as or similar to a marker string may comprise a similarity vector generator that generates a similarity vector comprised of one or more similarity values based upon one or more comparisons between the marker string and the string; a segment location set generate that uses the similarity vector to generate a set of segmentation locations; and a string segmenter that uses the set of segmentation locations to segment the string. In embodiments, a segmentation location marks the beginning of a discrete segment in the string.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that the scope of the invention is not limited to these particular embodiments.

FIG. 2 depicts a method for segmenting a string using similarity values according to various embodiments of the invention.

DETAILED DESCRIPTION OF THE PREFERRED EMBODIMENTS

Figure 1A:
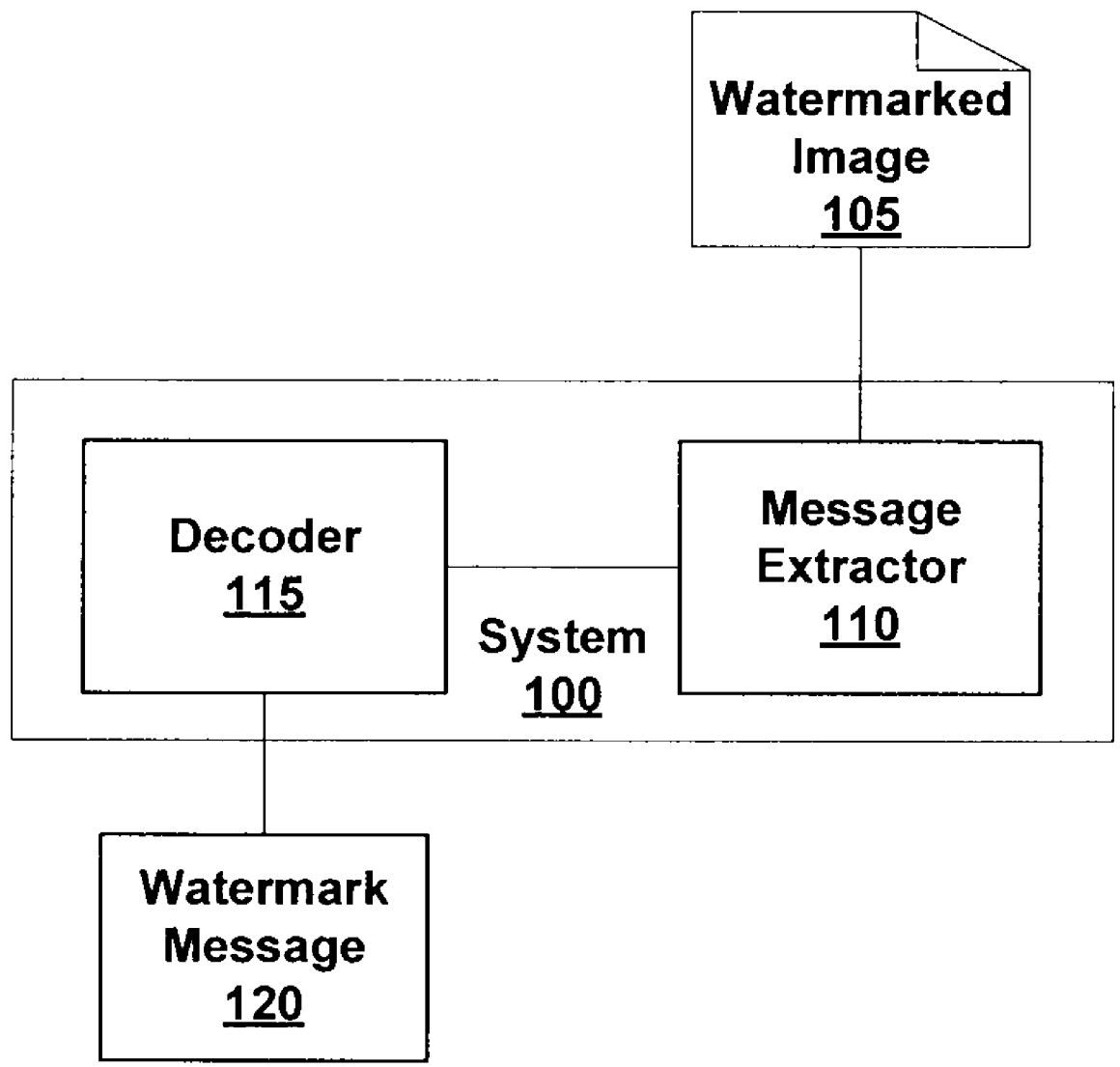
FIG. 1A depicts a block diagram of a system for extracting a watermark message from an image according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Systems and methods are described for segmenting a string comprised of one or more string segments using similarity values. In embodiments, each string segment may contain at least a variant of a marker string prefix that may be used to determine the beginning of a string segment in the string. In embodiments, a similarity value representing the result of comparing the marker string to substrings of the string may be computed, and a similarity vector representing the set of comparisons for all of the locations on the string may be generated. In embodiments, the similarity vector may be used to identify candidate segmentation locations in the string. In embodiments, a set of segmentation locations in the string may be derived from the candidate segmentation locations in the string, and the string may be segmented according to the set of segmentation locations.

One specific application of the present invention is its use in segmenting a data string extracted from a watermarked image. In embodiments, a watermark message may be given an indicator prefix "A" and then the message may be bit-encoded into message bit vector. At least one instance of a message bit vector may be embedded into a set of corresponding ordered embedding sites identified in an image, as described in commonly assigned U.S. patent application Ser. No. 11/945853, entitled "Embedding Data in Images," listing Ali Zandifar, Che-Bin Liu, and Jing Xiao as inventors, filed on Nov. 27, 2007, which is herein incorporated by reference in its entirety. In embodiments, an embedded watermark message may be extracted from an image by extracting and decoding a bitstream (i.e. a set of bit values) from a set of identified and ordered embedding sites in the image, as described in commonly assigned U.S. patent application Ser. No. 11/9442288, entitled "Extracting Data from Images," listing Ali Zandifar, Che-Bin Liu, and Jing Xiao as inventors, filed on Nov. 21, 2007, which is herein incorporated by reference in its entirety.

In embodiments, a bitstream may be segmented by being parsed to extract instances of the message bit vector that may have been written into the bitstream. In certain embodiments, identifying the bit encoded "A" indicator prefix facilitates identification of the beginning of a message bit vector within a bitstream.

Since generation of a watermarked image may have modified the image (for example, the watermarked image may be a scanned image), parsing the image bitstream may not be performed using exact token matching. For example, in certain embodiments, parsing the bitstream may be performed by determining bitwise similarity between a candidate bit vector within the bitstream and the bit vector representing the indicator prefix "A."

A. System Implementations

FIG. 1A depicts a system 100 for extracting a watermarked message 120 from a watermarked image 105 according to various embodiments of the invention. System 100 comprises a message extractor 110 and a decoder 115. In certain embodiments, the watermarked image 105 may have been received from a printer and/or a scanner. In embodiments, system 100 shares the encoding and embedding assumptions of the system that generated the watermarked image 105.

Figure 1B:
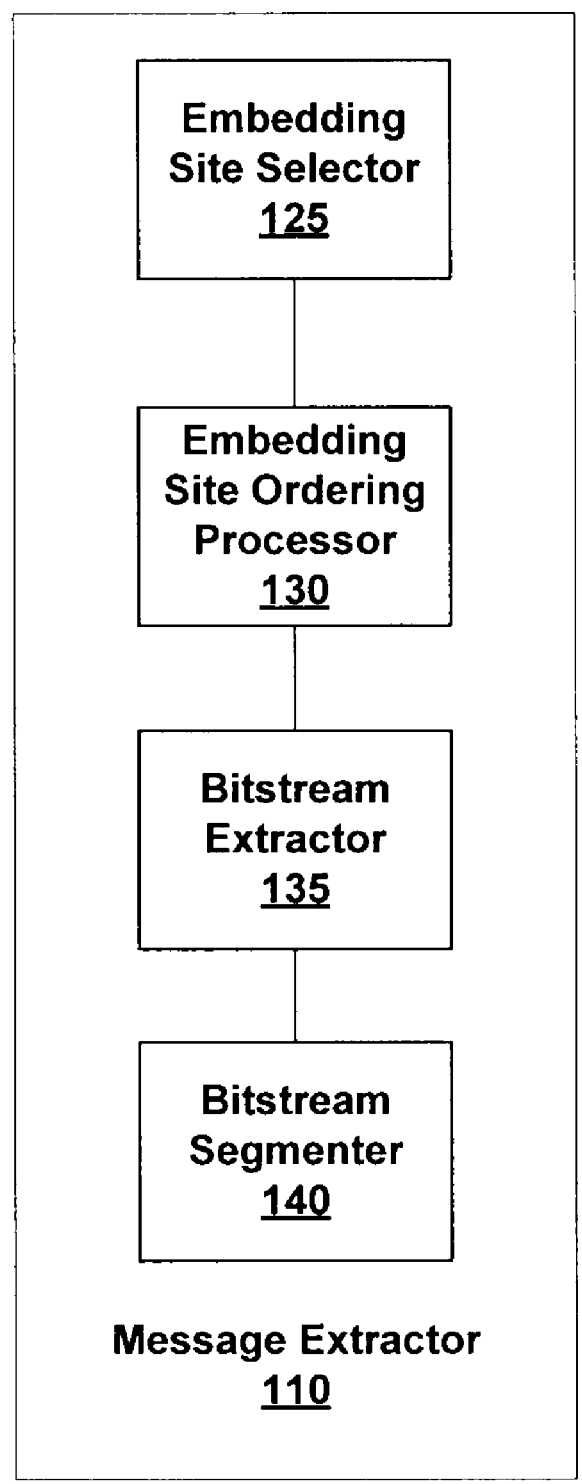
FIG. 1B depicts a block diagram of a message extractor, according to various embodiments of the invention.

In embodiments, message extractor 110 receives a watermarked image 105 and extracts one or more message bit vectors (or portions thereof) that have been embedded within the watermarked image 105. FIG. 1B depicts an embodiment of message extractor system 110 that comprises an embedding site selector 125 that identifies a set of candidate embedding sites in the image; an embedding site ordering processor 130 that orders the candidate embedding sites to form a set of ordered candidate embedding sites; a bitstream extractor 135 that extracts a set of data values from at least some of the set of ordered candidate embedding sites; and a bitstream segmenter 140 that segments the set of data values to obtain at least one message bit vector.

Figure 1C:
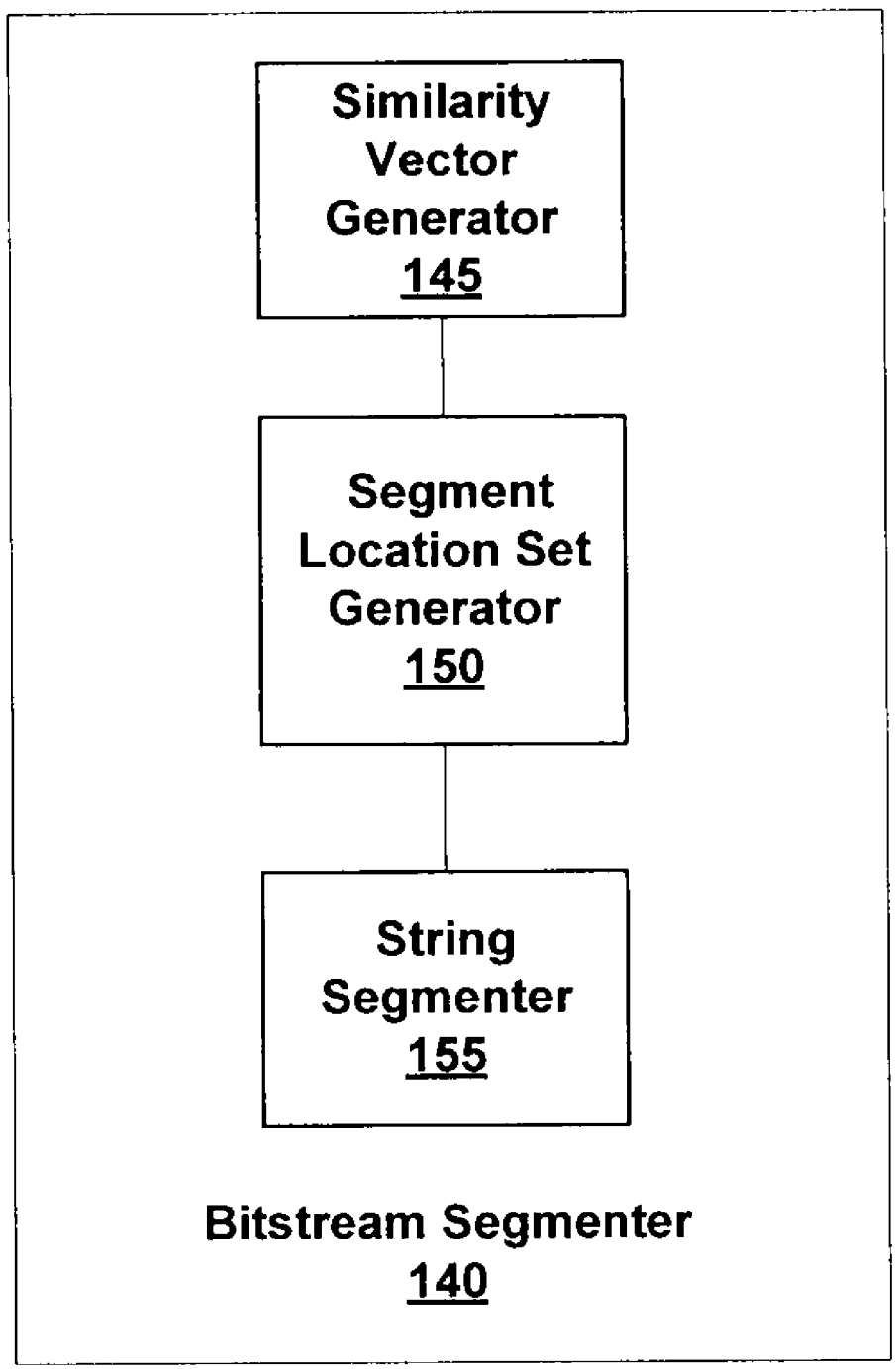
FIG. 1C depicts a block diagram of a bitstream segmenter according to various embodiments of the invention.

FIG. 1C depicts a bitstream segmenter system 140 for segmenting a string using similarity values according to various embodiments of the invention. System 140 comprises a similarity vector generator 145, a segment location set generator 150, and a string segmenter 155.

In embodiments, similarity vector generator 145 receives a string to be segmented ($Str_1$) and a marker string ($Str_m$), and generates a similarity vector (S). In embodiments, $Str_1$ may contain at least one string segment, and each string segment may contain at least a variant of a marker string $Str_m$ prefix. Such a prefix may be used to identify a segment location (i.e. the beginning of a string segment) in $Str_1$. In embodiments in which $Str_1$ contains multiple string segments, the segments may contain different content but use the same marker string prefix. In embodiments, $Str_1$ may be a bitstream that contains at least one message bit vector string segment. In embodiments, the message bit vector string segment may represent a bit-encoded watermark message.

In embodiments, similarity vector S has a length equal to $(Str_1 - Str_m + 1)$ and an element at an index (Indx) in S corresponds to a character at the index (Indx) of $Str_1$. In embodiments, an element S(Indx) may have a computed similarity value that represents the result of comparing $Str_m$ to a substring (SubStr) of $Str_1$ beginning at $Str_1$(Indx) and having a length equal to $Str_m$. In embodiments, the similarity value may be computed based on finding the longest common subsequence (hereafter LCS) between SubStr and $Str_m$ according to the equation:

$$\text{similarity value}(Str_m, SubStr) = \frac{\text{length}(LCS(Str_m, SubStr))}{\text{length}(SubStr)}$$

where LCS($Str_m$, SubStr) is the longest common subsequence between $Str_m$ and SubStr. For example, a method to compute an LCS is disclosed in Allison, L. and T. I. Dix, "A Bit-String Longest-Common-Subsequence Algorithm," *Inf. Proc. Lett.*, 23:305-310, December 1986, which is herein incorporated by reference in its entirety. Those skilled in the art will recognize that various methods to compare strings exist, and that the choice of comparison method is not critical to the invention. In embodiments, the elements of similarity vector S having the maximum similarity values may correspond to the candidate segmentation locations (i.e. most likely segmentation locations) in the string $Str_1$.

In embodiments, segment location set generator 150 receives a similarity vector S, a string to be segmented ($Str_1$), and the length of a string segment, and identifies a set of segmentation locations in $Str_1$. In embodiments in which the string segments have the same length, the number of string segments expected to be contained in $Str_1$ may be computed by dividing the length of $Str_1$ by the length of a string segment. In embodiments, the string segments may have different lengths but limited to a maximum length. In this case, the expected number of string segments may be computed by dividing the length of $Str_1$ by the maximum length of a string segment. In embodiments, string segments of different lengths may comprise a periodic pattern within $Str_1$. In such cases, the expected number of string segments may be computed by dividing the length of $Str_1$ by the length of a pattern of string segments. The expected number of string segments may be used to determine a set of ideal segmentation locations in $Str_1$.

In embodiments, $Str_1$ may contain errors. For example, in embodiments in which $Str_1$ is a bitstream extracted from an image, $Str_1$ may contain errors such as missing characters or swapped characters; such errors may have been introduced as a result of a process (printing and/or scanning, for example) used to generate the image from which $Str_1$ was extracted. In embodiments in which $Str_1$ does not contain errors, the set of ideal segmentation locations may correspond to the set of segmentation locations in $Str_1$. In alternative embodiments, a set of segmentation locations in $Str_1$ may be derived from the candidate segmentation locations that are identified in the similarity vector S.

In embodiments, string segmenter 155 receives a string to be segmented ($Str_1$) and a set of segmentation locations, and uses the set of segmentation locations to segment $Str_1$.

B. Methods for Segmenting a String Using Similarity Measures

FIG. 2 depicts a method 200 for segmenting a string using similarity values according to embodiments of the invention. Method 200 comprises the steps of computing a similarity vector using a similarity value measurement between a marker string and substrings of a string to be segmented (step 205); identifying a set of segmentation locations in the string (step 210); and segmenting the string using the set of segmentation locations (step 215). Method 200 may be implemented by embodiments of bitstream segmenter 140.

1. Computing a Similarity Vector

Figure 3:
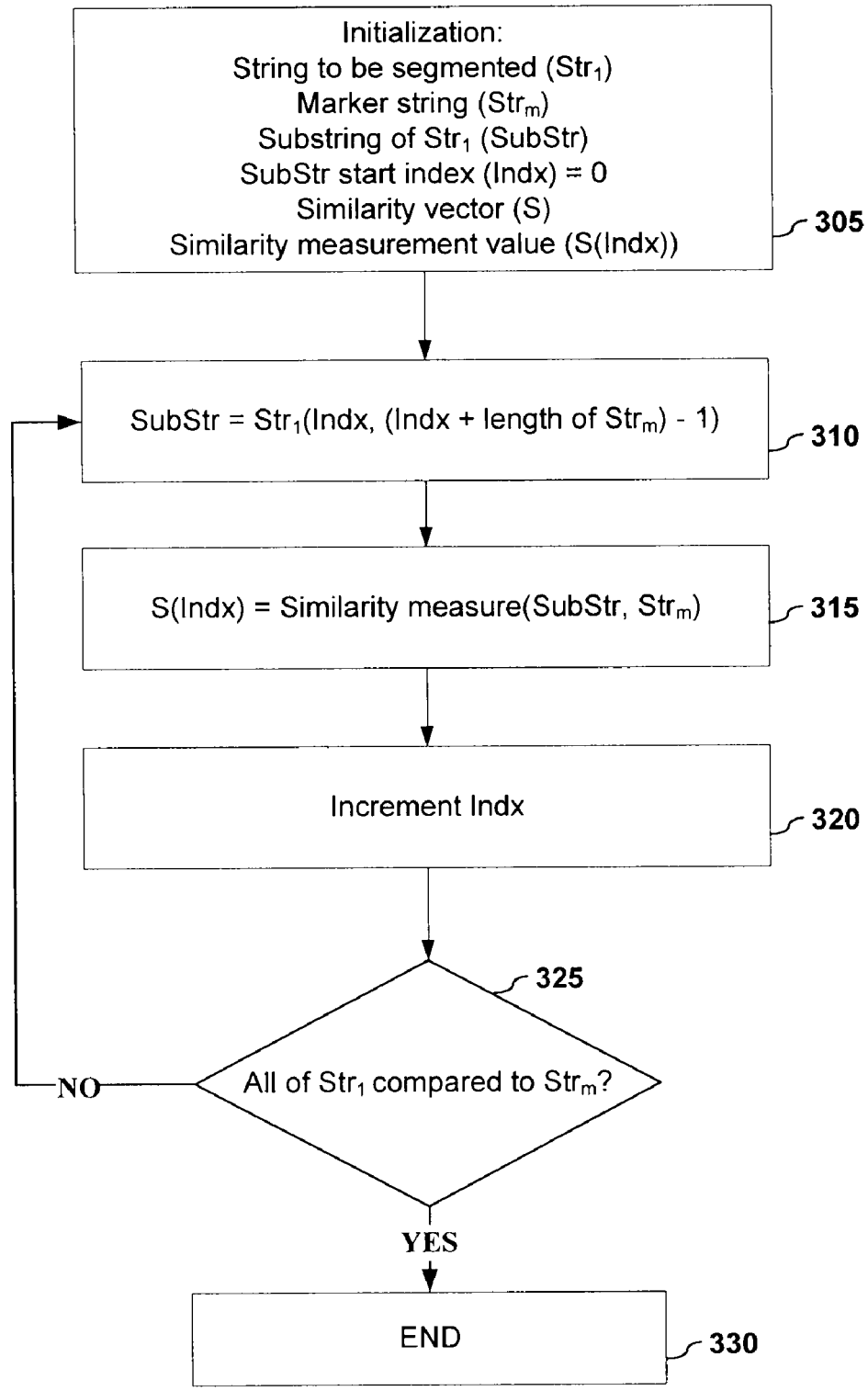
FIG. 3 depicts a method for computing a similarity vector according to various embodiments of the invention.

FIG. 3 depicts a method 300 for computing a similarity vector according to embodiments of the invention. Method 300 may be implemented as step 205 of method 200, and in embodiments of similarity vector generator 145.

In embodiments, a string to be segmented ($Str_1$) may contain at least one string segment, and each string segment may contain at least a variant of a marker string $Str_m$ prefix. In embodiments, such a prefix may be used to identify a segmentation location (i.e. the beginning of a string segment) in $Str_1$. In embodiments, $Str_1$ may be a bitstream that contains at least one message bit vector string segment. In embodiments, the message bit vector string segment may represent a bit-encoded watermark message.

In embodiments, similarity vector S has a length equal to ($Str_1 - Str_m + 1$) and an element at an index (Indx) in S corresponds to a character at the index (Indx) of $Str_1$. In embodiments, an element S(Indx) may have a computed similarity value that represents a result of comparing $Str_m$ to a substring (SubStr) of $Str_1$ beginning at $Str_1$(Indx) and having a length equal to $Str_m$. In embodiments, Indx is initialized to be 0, the first index of $Str_1$ (step 305).

In embodiments, the similarity value may be computed (step 310) based on finding the longest common subsequence (hereafter LCS) between SubStr and $Str_m$ according to the equation:

$$\text{similarity value}(Str_m, SubStr) = \frac{\text{length}(LCS(Str_m, SubStr))}{\text{length}(SubStr)}$$

where $LCS(Str_m, SubStr)$ is the longest common subsequence between $Str_m$ and SubStr. The index of a similarity value in the similarity vector S correlates with the index of the first character of the substring from $Str_1$ that generated the similarity value. Those skilled in the art will recognize that various methods to compare strings and compute similarity values exist, and that the choice of comparison method is not critical to the invention.

In embodiments, the computed similarity value for the substring in $Str_1$ starting at position Indx is assigned to S(Indx), the element of the similarity vector S at index Indx (step 315). Indx then is incremented (step 320), and steps 310, 315, and 320 are repeated until all of $Str_1$ has been compared to $Str_m$ (step 325, step 330). In embodiments, the elements of similarity vector S having the maximum similarity values may correspond to the candidate segmentation locations (i.e. most likely segmentation locations) in the string $Str_1$.

Figure 4:
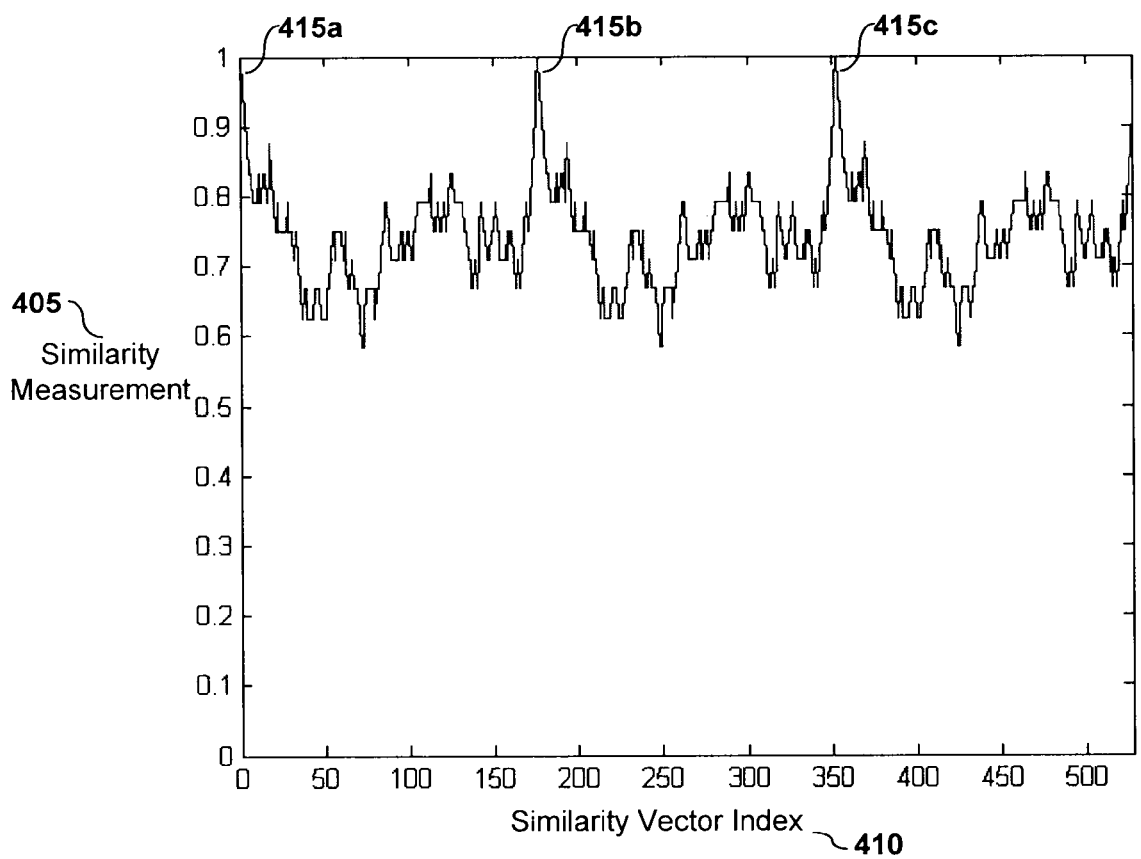
FIG. 4 illustrates the values of the elements of a similarity vector according to various embodiments of the invention.

FIG. 4 illustrates an example 400 of the elements (e.g. similarity values) of a computed similarity vector according to embodiments of the invention. The example is a plot of the similarity measurement 405 at index locations of the similarity vector 410, which is also at index locations of the string to be segmented, $Str_1$. In this example, there are three candidate segmentation locations (415a, 415b, and 415c) that represent the indices of $Str_1$ corresponding to the maximum similarity values found in the similarity vector S.

2. Identifying a Set of Segmentation Locations

Figure 5:
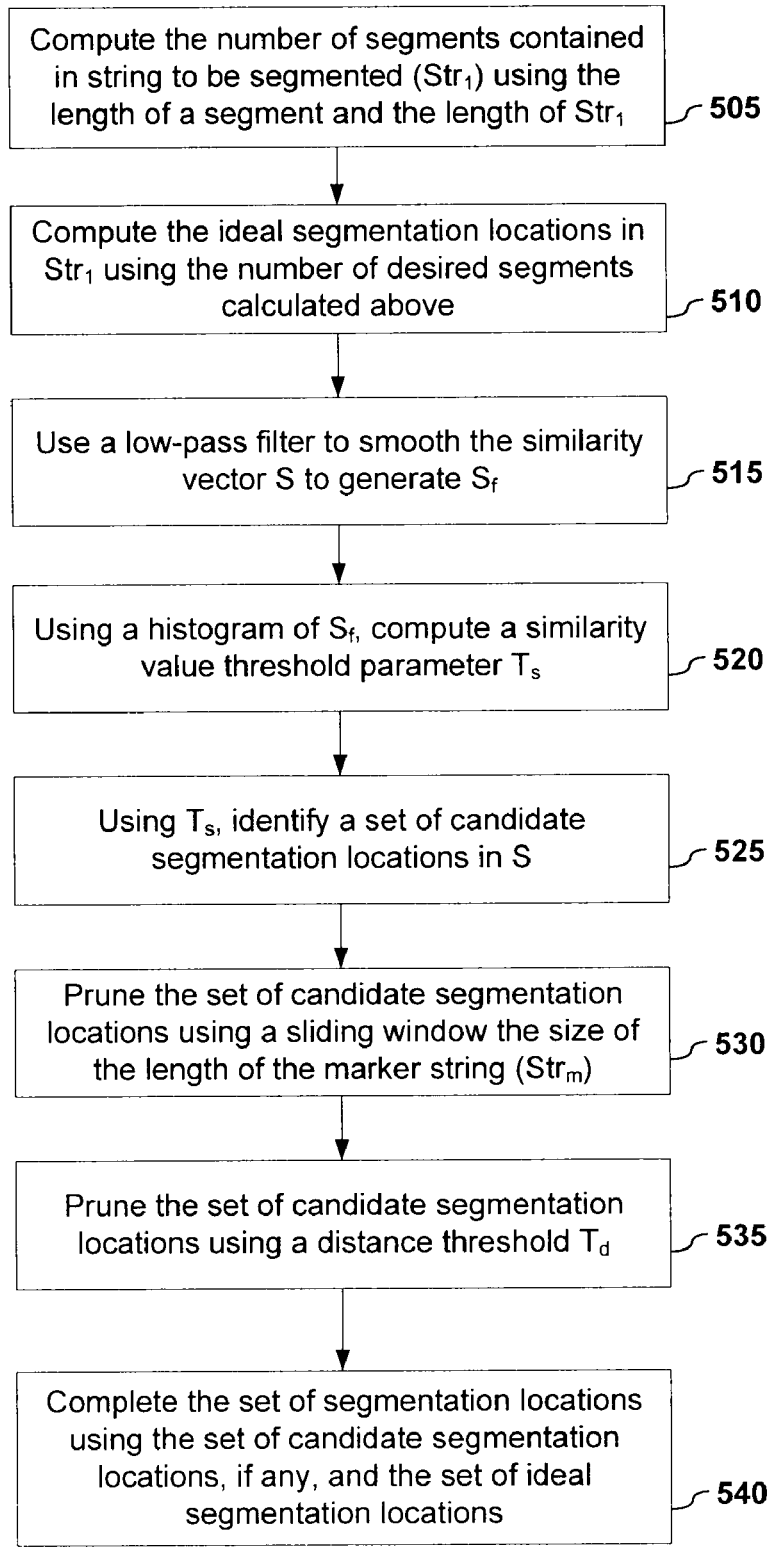
FIG. 5 depicts a method for identifying a set of segmentation locations in a string according to various embodiments of the invention.

FIG. 5 depicts a method 500 for identifying a set of segmentation locations in a string to be segmented according to embodiments of the invention. Method 500 may be implemented as step 210 in method 200, and in embodiments of segment location set generator 150.

In embodiments, the string to be segmented ($Str_1$) may contain one or more string segments. In embodiments, the number of string segments expected to be contained in $Str_1$ may be computed by dividing the length of $Str_1$ by the length of a string segment (step 505). The expected number of string segments may be used to determine a set of ideal segmentation locations in $Str_1$ (step 510).

In embodiments, $Str_1$ may contain errors. For example, in embodiments in which $Str_1$ is a bitstream extracted from an image, $Str_1$ may contain errors such as missing characters or swapped characters; such errors may have been introduced as a result of a process (printing and/or scanning, for example) used to generate the image from which $Str_1$ was extracted. In embodiments in which $Str_1$ is known not to contain errors, the set of ideal segmentation locations may correspond to the candidate segmentation locations in the similarity vector S, and a set of segmentation locations in $Str_1$ corresponding to the set of ideal segmentation locations may be identified. In alternative embodiments, a set of segmentation locations in $Str_1$ may be derived from the candidate segmentation locations that are identified in the similarity vector S (steps 515 through 540).

Because errors may exist in the string to be segmented $Str_1$, and also due to chance, it is beneficial to over include candidate segmentation locations and then prune locations by performing one or more additional operations. In embodiments, the set of candidate segmentation locations may be identified by computing a similarity value threshold parameter ($T_s$) and removing any location from the set of candidate segmentation locations that has a similarity value less than $T_s$. In embodiments, $T_s$ may be computed by generating a smoothed similarity vector $S_f$ from the similarity vector S (step 515) and then creating a histogram of the similarity values in $S_f$. In embodiments, a low-pass filter applied to similarity vector S may be used to generate $S_f$. An example of a low-pass filter is a Gaussian filter, although those skilled in the art will recognize that other methods for smoothing vectors exist and that the selection of a method for smoothing the similarity vector S is not critical to the invention.

In embodiments, similarity value threshold parameter $T_s$ may be computed from a distribution of similarity values (step 520) in the smoothed similarity vector $S_f$. In an embodiment, $T_s$ is selected such that the fewest number of elements in the distribution satisfy the equation:

$$\text{number of elements}_{(similarity\ value \geq Ts)} \geq 3 * (\text{expected number of segments})$$

where number of elements$_{(similarity\ value \geq Ts)}$ is the number of elements in the distribution having a similarity value greater than or equal to $T_s$ and expected number of segments is the expected number of string segments determined to be contained in $Str_1$. Those skilled in the art will recognize that other methods exist for determining a similarity value threshold parameter and that the selection of a method for determining a similarity value threshold parameter is not critical to the invention. In embodiments, three times the number of expected segments was selected to allow for over inclusion. A different over inclusion factor other that 3 may be used.

Figure 7:
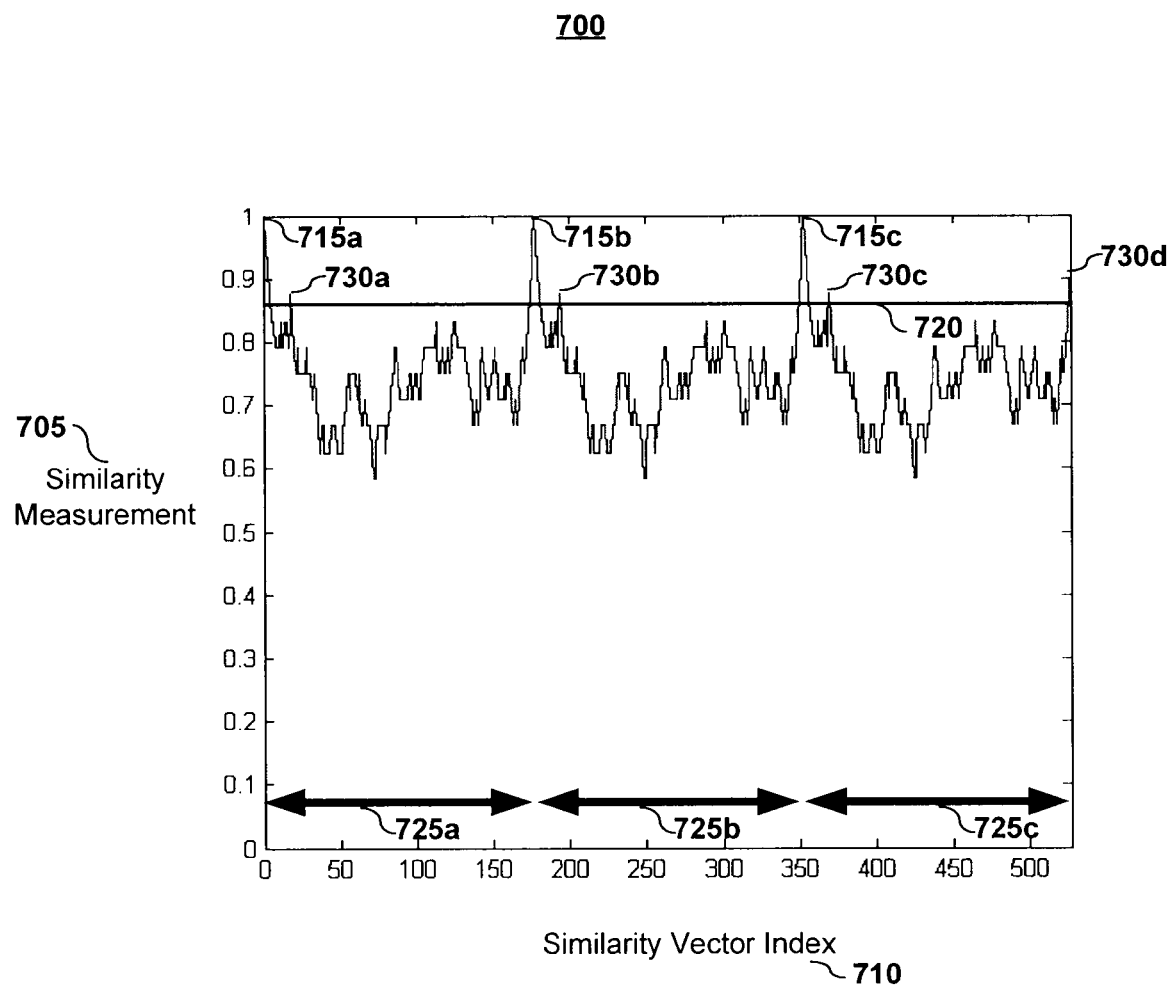
FIG. 7 illustrates a set of segmentation locations in a string that have been identified using a similarity vector according to various embodiments of the invention.

FIG. 7 illustrates an example 700 of a set of segmentation locations in a string that have been identified using a similarity vector according to various embodiments of the invention. The example is a plot of the similarity measurement 705 at each index of a similarity vector 710. In this example, there are seven candidate segmentation locations (715a-715c and 730a-730d) that have similarity values greater than or equal to the similarity value threshold parameter $T_s$ (720).

In embodiments, the set of candidate segmentation locations with similarity values greater than the similarity value threshold parameter $T_s$ may be pruned in order to exclude adjacent candidate segmentation locations that may be within a local distance (step 530). In embodiments, a sliding window the length of $Str_m$ may be moved along S, one index at a time. If multiple candidate segmentation locations are present within the window, only the candidate segmentation location with the maximum similarity value within the window is retained in the set of candidate segmentation locations.

In embodiments, the set of candidate segmentation locations may be pruned based upon a distance comparison between the set of candidate segmentation locations and the set of ideal segmentation locations in $Str_1$ (step 535). In embodiments, a candidate segmentation location is compared to its closest ideal segmentation location and the candidate segmentation location is removed from the set of candidate segmentation locations if it is not within a distance threshold value $T_d$ of the ideal segmentation location. In embodiments, for example, a distance threshold value $T_d$ of 10 position is used.

a) Deriving a Set of Segmentation Locations

Figure 6:
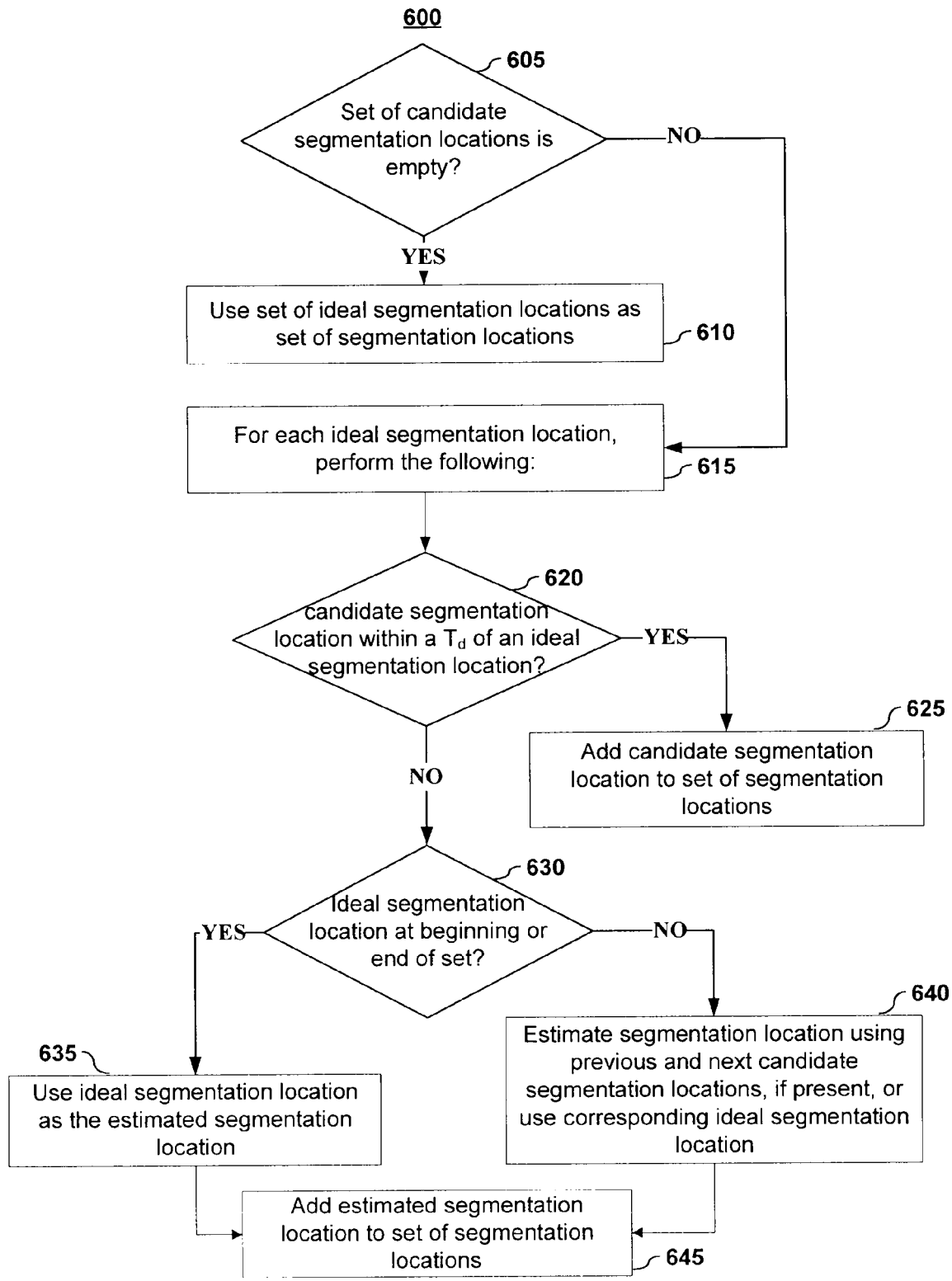
FIG. 6 depicts a method for completing a set of segmentation locations in a string according to various embodiments of the invention.

FIG. 6 depicts a method 600 for using a set of candidate segmentation locations and a set of ideal segmentation locations to derive the set of segmentation locations in a string containing segments according to embodiments of the invention. Method 600 may be implemented as step 540 of embodiments of method 500 and may be implemented in embodiments of segment location set generator 150.

In embodiments, the set of ideal segmentation locations may be used as the set of segmentation locations in the string containing segments ($Str_1$) if the set of candidate segmentation locations is empty (steps 605 and 610). If the set of candidate segmentation locations is not empty, candidate segmentation locations in the set are processed according to the set of ideal segmentation locations (steps 605 and 615). For an ideal segmentation location, if a candidate segmentation location is within the distance threshold value $T_d$ of the ideal segmentation location (step 620), the candidate segmentation location is added to the set of segmentation locations (step 625). If there is not a candidate segmentation location within the distance threshold value $T_d$ of the ideal segmentation location (step 620), its corresponding segmentation location may be estimated. If the ideal segmentation location is at either the beginning or the end of the set of ideal segmentation locations, the ideal segmentation location is added to the set of segmentation locations (step 630, step 635 and step 645). Otherwise, the previous segmentation location and the next segmentation location may be used to estimate a segmentation location (step 630 and step 640), and the estimated segmentation location is added to the set of segmentation locations (step 645). In embodiments, the previous segmentation location and the next segmentation location are used if they are, respectively, within the distance threshold value $T_d$ of the previous and next ideal segmentation locations that are adjacent to the current/corresponding ideal segmentation location. If a next or a previous segmentation location is not within the distance threshold value $T_d$ of the next and previous ideal segmentation locations that are adjacent to the current ideal segmentation location, the current ideal segmentation location is used as the segmentation location in the set of segmentation locations.

3. Segmenting a String Using Similarity Values

The example 700 illustrated in FIG. 7 depicts a set of segmentation locations in a string that have been identified using a similarity vector according to various embodiments of the invention. The 3 segmentation locations (715a, 715b, and 715c) correspond to the beginning locations of 3 segments (725a, 725b, and 725c) in the string. String segmentation using a set of segmentation locations may be implemented as step 215 of embodiments of method 200 and in embodiments of string segmenter 155.

It shall be noted that the present invention may be implemented in any instruction-execution/computing device or system capable of processing the image data, including, without limitation, a general-purpose computer and a specific computer, such as one intended for data processing. The present invention may also be implemented into other computing devices and systems, including without limitation, a digital camera, a printer, a scanner, a multiple function printer/scanner, a facsimile machine, a multimedia device, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 8:
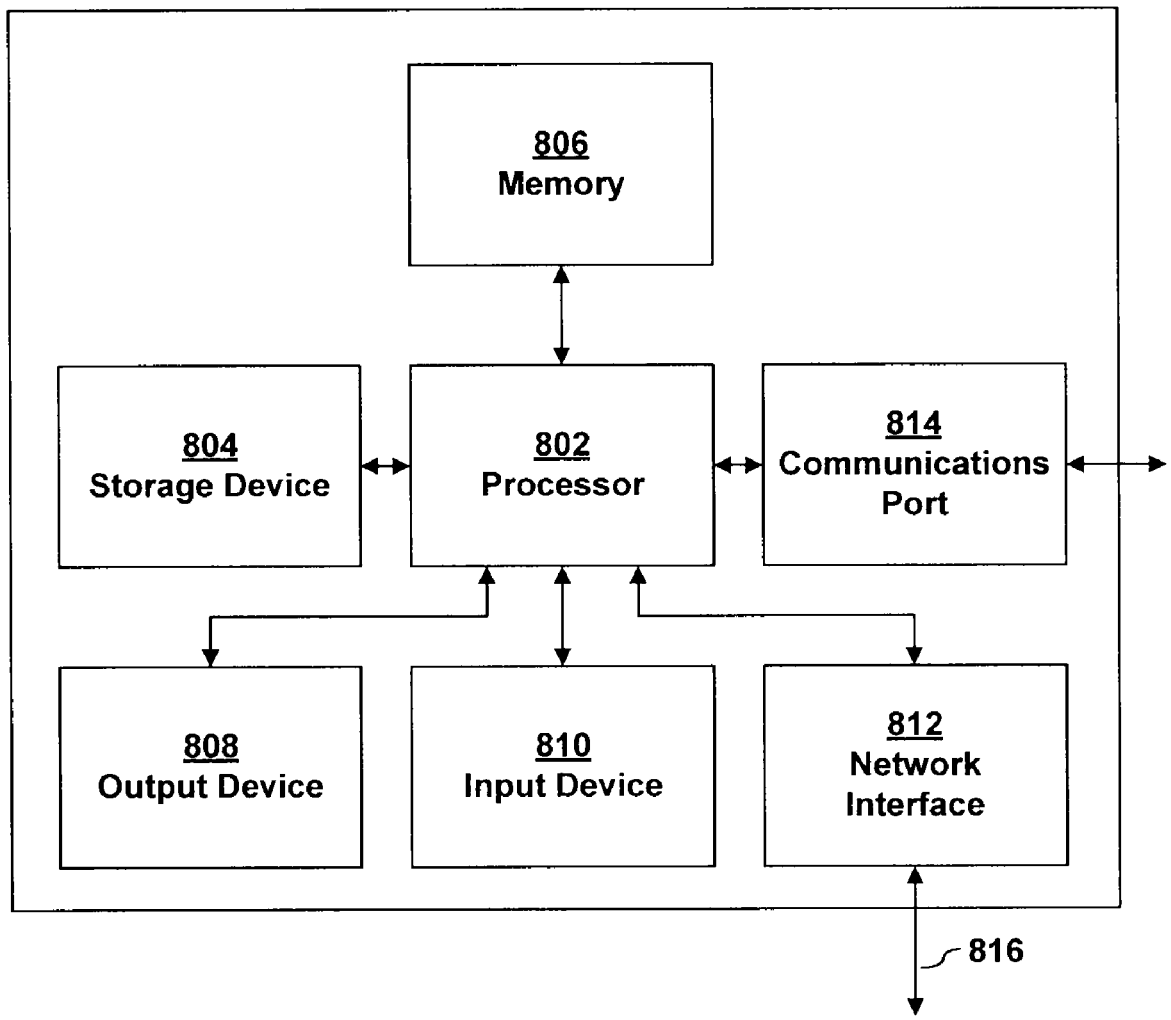
FIG. 8 depicts a block diagram of a computing system according to various embodiments of the invention.

FIG. 8 depicts a functional block diagram of an embodiment of an instruction-execution/computing device 800 that may implement or embody embodiments of the present invention. As illustrated in FIG. 8, a processor 802 executes software instructions and interacts with other system components. In an embodiment, processor 802 may be a general purpose processor such as an AMD processor, an INTEL x86 processor, a SUN MICROSYSTEMS SPARC, or a POWERPC compatible-CPU, or the processor may be an application specific processor or processors. A storage device 804, coupled to processor 802, provides long-term storage of data and software programs. Storage device 804 may be a hard disk drive and/or another device capable of storing data, such as a computer-readable media (e.g., diskettes, tapes, compact disk, DVD, and the like) drive or a solid-state memory device. Storage device 804 may hold programs, instructions, and/or data for use with processor 802. In an embodiment, programs or instructions stored on or loaded from storage device 804 may be loaded into memory 806 and executed by processor 802. In an embodiment, storage device 804 holds programs or instructions for implementing an operating system on processor 802. In one embodiment, possible operating systems include, but are not limited to, UNIX, AIX, LINUX, Microsoft Windows, and the Apple MAC OS. In embodiments, the operating system executes on, and controls the operation of, the computing system 800.

An addressable memory 806, coupled to processor 802, may be used to store data and software instructions to be executed by processor 802. Memory 806 may be, for example, firmware, read only memory (ROM), flash memory, non-volatile random access memory (NVRAM), random access memory (RAM), or any combination thereof. In one embodiment, memory 806 stores a number of software objects, otherwise known as services, utilities, components, or modules. One skilled in the art will also recognize that storage 804 and memory 806 may be the same items and function in both capacities. In an embodiment, one or more of the components of FIGS. 1A through 1E may be modules stored in memory 804, 806 and executed by processor 802.

In an embodiment, computing system 800 provides the ability to communicate with other devices, other networks, or both. Computing system 800 may include one or more network interfaces or adapters 812, 814 to communicatively couple computing system 800 to other networks and devices. For example, computing system 800 may include a network interface 812, a communications port 814, or both, each of which are communicatively coupled to processor 802, and which may be used to couple computing system 800 to other computer systems, networks, and devices.

In an embodiment, computing system 800 may include one or more output devices 808, coupled to processor 802, to facilitate displaying graphics and text. Output devices 808 may include, but are not limited to, a display, LCD screen, CRT monitor, printer, touch screen, or other device for displaying information. Computing system 800 may also include a graphics adapter (not shown) to assist in displaying information or images on output device 808.

One or more input devices 810, coupled to processor 802, may be used to facilitate user input. Input device 810 may include, but are not limited to, a pointing device, such as a mouse, trackball, or touchpad, and may also include a keyboard or keypad to input data or instructions into computing system 800.

In an embodiment, computing system 800 may receive input, whether through communications port 814, network interface 812, stored data in memory 804/806, or through an input device 810, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for segmenting a string comprising one or more segments into discrete segments, wherein each of the one or more segments comprises data that is the same as or similar to a marker string, the method comprising:
   generating a similarity vector comprising a plurality of similarity values and associated locations within the string wherein a similarity value represents a comparison of the marker string and at least a portion of the string and an associated location associated with the similarity value is the location within the string of the start of the at least a portion of the string used in the comparison;
   identifying a set of ideal segmentation locations based upon an expected number of discrete segments within the string;
   using the similarity vector to identify a set of candidate segmentation locations;
   responsive to a candidate segmentation location having a similarity value less than another candidate segmentation location within a local window, removing the candidate segmentation location from the set of candidate segmentation locations;
   responsive to a candidate segmentation location and a closest ideal segmentation location being at a distance that is greater than the distance threshold, removing the candidate segmentation location from the set of candidate segmentation locations; and
   using the set of candidate segmentation locations and the set of ideal segmentation locations to generate a set of segmentation locations; and
   using the set of segmentation locations to segment the string.

2. The method of claim 1 wherein a similarity value from the plurality of similarity values is obtained by performing the steps comprising:
   selecting a first substring of the string wherein the first substring has a number of characters equal to a number of characters of the marker string;
   identifying a longest common subsequence between the marker string and the first substring; and
   calculating the similarity value by dividing the number of characters of the longest common subsequence length by the number of characters of the first substring.

3. The method of claim 1 wherein the step of using the similarity vector to identify a set of candidate segmentation locations comprises:
   generating a smoothed similarity vector by applying a low-pass filter to the similarity vector;
   calculating a histogram of similarity values from the smoothed similarity vector;
   calculating a similarity value threshold using the histogram of similarity values in the smoothed similarity vector and the expected number of discrete segments; and
   responsive to an element of the similarity vector having a similarity value that is greater than or equal to the similarity value threshold, adding the element to the set of candidate segmentation locations.

4. The method of claim 1 wherein the local window is equal to the number of characters of the marker string.

5. The method of claim 1 wherein the step of using the set of candidate segmentation locations and the set of ideal segmentation locations to generate the set of segmentation locations comprises:

responsive to the set of candidate segmentation locations being an empty set, defining the set of ideal segmentation locations as a set of segmentation locations; and responsive to the set of candidate segmentation locations not being an empty set, using at least some of the candidate segmentation locations to define a set of segmentation locations.

6. The method of claim 5 wherein using at least some of the candidate segmentation locations to define a set of segmentation locations comprises:

responsive to an ideal segmentation location being within the distance threshold of a candidate segmentation location, adding the candidate segmentation location to the set of segmentation locations;

responsive to an ideal segmentation location that is at the beginning of the set of ideal segmentation locations not having a candidate segmentation location within the distance threshold of the ideal segmentation location, adding the ideal segmentation location to the set of segmentation locations;

responsive to an ideal segmentation location that is at the end of the set of ideal segmentation locations not having a candidate segmentation location within the distance threshold of the ideal segmentation location, adding the ideal segmentation location to the set of segmentation locations; and responsive to an ideal segmentation location that is not at the beginning or at the end of the set of ideal segmentation locations not being within the distance threshold of a candidate segmentation location, calculating an estimated segmentation location that is added to the set of segmentation locations by:

responsive to a previous segmentation location being within the distance threshold of a previous ideal segmentation location that is adjacent to the ideal segmentation location and a next segmentation location being within the distance threshold of a subsequent ideal segmentation location that is adjacent to the ideal segmentation location, using the previous segmentation location and the next segmentation location to calculate the estimated segmentation location; and responsive to either the previous segmentation location or the next segmentation location not being within the distance threshold of an ideal segmentation location, using the ideal segmentation location as the estimated segmentation location.

7. A tangible computer readable medium having instructions for performing the method of claim 1.

8. A method for segmenting a string comprising one or more segments into discrete segments, wherein each of the one or more segments comprises data that is at least a variant of a marker string, the method comprising:

generating a similarity vector comprising a plurality of similarity values and associated locations within the string wherein a similarity value represents a comparison of the marker string and at least a portion of the string and an associated location associated with the similarity value is the location within the string of the start of the at least a portion of the string used in the comparison;

identifying a set of ideal segmentation locations in the string based upon an expected number of discrete segments within the string;

using the similarity vector to generate a set of candidate segmentation locations for segmenting the string based on a comparison of each of a plurality of elements of the similarity vector to a similarity value threshold obtained from a smoothed similarity vector;

using the set of candidate segmentation locations and the set of ideal segmentation locations to generate the set of segmentation locations; and using the set of segmentation locations to segment the string.

9. The method of claim 8 wherein the step of using the similarity vector to generate a set of candidate segmentation locations for segmenting the string based on a comparison of each of a plurality of elements of the similarity vector to a similarity value threshold obtained from a smoothed similarity vector comprises:

generating the smoothed similarity vector by applying a low-pass filter to the similarity vector;

calculating a histogram of similarity values from the smoothed similarity vector;

calculating the similarity value threshold using the histogram of similarity values in the smoothed similarity vector and the expected number of discrete segments; and responsive to an element of the similarity vector having a similarity value that is greater than or equal to the similarity value threshold, adding the element to the set of candidate segmentation locations.

10. The method of claim 8 wherein the step of using the set of candidate segmentation locations and the set of ideal segmentation locations to generate the set of segmentation locations comprises:

responsive to the set of candidate segmentation locations being an empty set, defining the set of ideal segmentation locations as a set of segmentation locations; and responsive to the set of candidate segmentation locations not being an empty set, using at least some of the candidate segmentation locations to define a set of segmentation locations.

11. The method of claim 10 wherein using at least some of the candidate segmentation locations to define a set of segmentation locations comprises:

responsive to an ideal segmentation location being within the distance threshold of a candidate segmentation location, adding the candidate segmentation location to the set of segmentation locations;

responsive to an ideal segmentation location that is at the beginning of the set of ideal segmentation locations not having a candidate segmentation location within the distance threshold of the ideal segmentation location, adding the ideal segmentation location to the set of segmentation locations;

responsive to an ideal segmentation location that is at the end of the set of ideal segmentation locations not having a candidate segmentation location within the distance threshold of the ideal segmentation location, adding the ideal segmentation location to the set of segmentation locations; and responsive to an ideal segmentation location that is not at the beginning or at the end of the set of ideal segmentation locations not being within the distance threshold of a candidate segmentation location, calculating an estimated segmentation location that is added to the set of segmentation locations by:

responsive to a previous segmentation location being within the distance threshold of a previous ideal segmentation location that is adjacent to the ideal segmentation location and a next segmentation location being within the distance threshold of a subsequent ideal segmentation location that is adjacent to the ideal segmentation location, using the previous segmentation location and the next segmentation location to calculate the estimated segmentation location; and responsive to either the previous segmentation location or the next segmentation location not being within the distance threshold of an ideal segmentation location, using the ideal segmentation location as the estimated segmentation location.

12. A tangible computer readable medium having instructions for performing the method of claim 8.

13. A system for segmenting a string comprising one or more segments into discrete segments, wherein each of the one or more segments comprises data that is the same as or similar to a marker string, the system comprising:

a similarity vector generator, coupled to receive the string and the marker string, that generates a similarity vector comprising a plurality of similarity values and associated locations within the string wherein a similarity value represents a comparison of the marker string and at least a portion of the string and an associated location associated with the similarity value is the location within the string of the start of the at least a portion of the string used in the comparison;

a segment location set generator, coupled to receive the similarity vector, that identifies a set of ideal segmentation locations based upon an expected number of discrete segments within the string, uses the similarity vector to identify a set of candidate segmentation locations, responsive to a candidate segmentation location having a similarity value less than another candidate segmentation location within a local window, removes the candidate segmentation location from the set of candidate segmentation locations, responsive to a candidate segmentation location and a closest ideal segmentation location being at a distance that is greater than a distance threshold, removes the candidate segmentation location from the set of candidate segmentation locations, and uses the set of candidate segmentation locations and the set of ideal segmentation locations to generate a set of segmentation locations, wherein a segmentation location marks the beginning of a discrete segment in the string; and a string segmenter, coupled to receive the set of segmentation locations, that uses the set of segmentation locations to segment the string.

14. The system of claim 13 wherein a similarity value from the plurality of similarity values is obtained by performing the steps comprising:

selecting a first substring of the string wherein the first substring has a number of characters equal to a number of characters of the marker string;

identifying a longest common subsequence between the marker string and the first substring; and calculating the similarity value by dividing the number of characters of the longest common subsequence length by the number of characters of the first substring.

15. The system of claim 13 wherein performing the steps to use the similarity vector to identify a set of candidate segmentation locations comprises:

generating a smoothed similarity vector by applying a low-pass filter to the similarity vector;

calculating a histogram of similarity values from the smoothed similarity vector;

calculating a similarity value threshold using the histogram of similarity values in the smoothed similarity vector and the expected number of discrete segments; and responsive to an element of the similarity vector having a similarity value that is greater than or equal to the similarity value threshold, adding the element to the set of candidate segmentation locations.

16. The system of claim 13 wherein the local window is equal to the number of characters of the marker string.

17. The system of claim 13 wherein performing the steps to use the set of candidate segmentation locations and the set of ideal segmentation locations to generate the set of segmentation locations comprises:

responsive to the set of candidate segmentation locations being an empty set, defining the set of ideal segmentation locations as a set of segmentation locations; and responsive to the set of candidate segmentation locations not being an empty set, using at least some of the candidate segmentation locations to define a set of segmentation locations.

18. The system of claim 17 wherein using at least some of the candidate segmentation locations to define a set of segmentation locations comprises:

responsive to an ideal segmentation location being within the distance threshold of a candidate segmentation location, adding the candidate segmentation location to the set of segmentation locations;

responsive to an ideal segmentation location that is at the beginning of the set of ideal segmentation locations not having a candidate segmentation location within the distance threshold of the ideal segmentation location, adding the ideal segmentation location to the set of segmentation locations;

responsive to an ideal segmentation location that is at the end of the set of ideal segmentation locations not having a candidate segmentation location within the distance threshold of the ideal segmentation location, adding the ideal segmentation location to the set of segmentation locations; and responsive to an ideal segmentation location that is not at the beginning or at the end of the set of ideal segmentation locations not being within the distance threshold of a candidate segmentation location, calculating an estimated segmentation location that is added to the set of segmentation locations by:

responsive to a previous segmentation location being within the distance threshold of a previous ideal segmentation location that is adjacent to the ideal segmentation location and a next segmentation location being within the distance threshold of a subsequent ideal segmentation location that is adjacent to the ideal segmentation location, using the previous segmentation location and the next segmentation location to calculate the estimated segmentation location; and responsive to either the previous segmentation location or the next segmentation location not being within the distance threshold of an ideal segmentation location, using the ideal segmentation location as the estimated segmentation location.

* * * * *